March 8, 1960     K. G. H. LINDSTRÖM     2,927,951
HERMETICALLY CLOSED STORAGE CELL AND A METHOD
IN THE MANUFACTURE OF SUCH CELL
Filed March 25, 1955

INVENTOR
Karl Göran Hugo Lindström

BY Pierce, Scheffler & Parker
ATTORNEYS

United States Patent Office 2,927,951
Patented Mar. 8, 1960

2,927,951

HERMETICALLY CLOSED STORAGE CELL AND A METHOD IN THE MANUFACTURE OF SUCH CELL

Karl Göran Hugo Lindström, Oskarshamn, Sweden, assignor to Svenska Ackumulator Aktiebolaget Jungner, Stockholm, Sweden Application March 25, 1955, Serial No. 496,928

Claims priority, application Sweden August 19, 1954

2 Claims. (Cl. 136—77)

The present invention relates to an electric storage cell, in which the gases developed during charging, are bound by reaction with the active material of the electrodes. Such storage cells can thus be sealed or more or less closed in the various operating conditions. The cell may be hermetically sealed or alternatively be closed but provided with a safety valve or the like, which is opened at a predetermined superatmospheric pressure in the cell. The wall of the cell may also be provided with a hole or vent, which may be so small as to permit gas to escape while preventing leakage of liquid.

The exact mechanism of the process of reuniting the gases with the active electrode material is not believed to be surely known, inasmuch as one may take it for granted that the oxygen developed at the positive electrode oxidizes the negative electrode rather directly, corresponding to a discharge of the latter. Any hydrogen gas developed at the negative electrode will find it more difficult to become reunited with the positive electrode, possibly as a result of some form of catalytic oxidation. However, the development of hydrogen gas may be avoided almost entirely by suitably dimensioning the capacities of the electrodes.

Thus, if the capacity of the negative electrode is greater than that of the positive electrode, the latter is the first to become fully charged, and as the development of oxygen gas commences, the developed oxygen becomes united with the active material of the negative electrode. If this reuniting process takes place with sufficient rapidity, a condition of equilibrium will be established for every discharging current, the oxygen gas being then absorbed as rapidly as it is formed, while the charging condition of the negative electrode and the internal gas pressure remain constant. However, the pre-requisite condition for the above described mechanism is that the gas bubbles developed at the respective electrodes must establish contact with an electrode surface of the opposite polarity, and that no gas must flow upwardly and out into the gas space of the cell. A first condition for this is a small distance between electrodes of opposite polarities.

A previously suggested solution of the problem involves the introduction of a separating member between the electrodes, said member consisting of more or less porous portions in combination with larger holes therethrough. An example of a suitable composition for such a separating member would be nylon fabric. A condition for proper functioning in this case is that the electrode plates are very close to the separating member. This system is operable but has certain, rather undesirable drawbacks. Thus, it has been found to be relatively expensive to insulate with such a fabric, and it is difficult to ensure the proper contact between the electrodes and the separating member.

The present invention obviates the above disadvantages effectively and also renders very superior results with respect to the maximum gas pressure during a given charging cycle.

The principle of the invention may be briefly decribed as one in which a plastic or viscous mass is used as a separating member, said mass preventing the gas bubbles formed at the electrode from immediately floating up into the gas space. In a battery utilizing such a separating member, the size of the bubble progressively increases so that said bubble bridges the electrode distance by degrees and comes into physical contact with an electrode of the opposite polarity, and becomes absorbed by this electrode. Subsequently the mass flows again to allow passage of another bubble therethrough.

In this way, the contact problem as outlined above has reached a complete solution.

The plastic mass is constituted by the used electrolyte mingled with a suitable admixture. This admixture may consist of a fine-grained powder of an electrically insulating material which is resistant to the electrolyte. Examples of such admixtures are plastic powder, aluminum oxide (for use in alkaline storage batteries) and infusorial earth (for use in lead accumulators).

It is also conceivable to use colloidal solutions in the electrolyte as a plastic mass for the purpose in view.

However, the mutual distance between the electrodes must be fixed independently of the plastic mass, and this is effected for instance by the use of a solid insulation of rods or bands of a plastic material or with the aid of a sparsely pressed grating or a perforated and optionally corrugated plastic foil between the electrode plates. If desired, the admixing powder may contain coarser grains serving as distance members.

A further advantage from the point of view of cost is also reached in this manner, since the electrode complex is insulated in the mounting of the cell by said solid insulation and is then placed in a dry condition into the cell vessel, whereupon so much of the fine-grained powder is filled in as the cell vessel will take, optionally on having been shaken down on a vibrating table, whereupon a suitable quantity of electrolyte is finally poured in, which is rapidly absorbed by the electrode complex and the powder. Thus all difficulties involved in providing an accurate fitting for proper contact between the plates and the separating members have been obviated.

It has been found in practice that storage cells of the type described have given excellent results so as to permit rapid charging and discharging of the cells with strong currents, also where the vessel of the cell is hermetically sealed, without the internal gas pressure in the cell vessel having ever exceeded 1 kilogram per square centimeter.

It has been found to be particularly advantageous to fill all spaces in the cell with the viscous mass, so that sludge and gas spaces entirely disappear.

Other objects and advantages of the invention will become apparent from a study of the following specification when considered in conjunction with the accompanying drawings in which.

Figure 1:
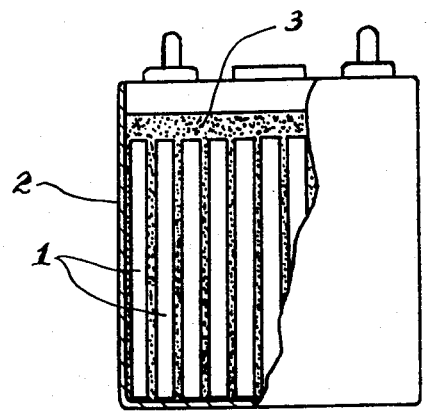
Fig. 1 is a partially-sectioned side elevational view of the cell.
Figure 2:
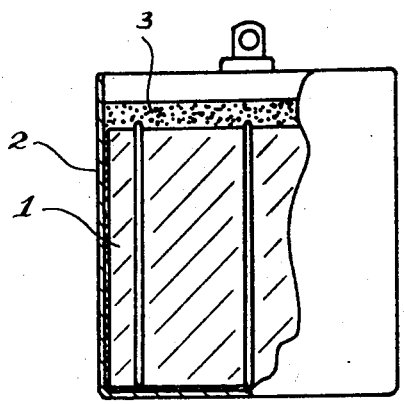
Fig. 2 is a partially-sectioned end elevational view of the cell.

An example of an embodiment of the invention will be indicated hereinafter in connection with a cell having an alkaline electrolyte and sintered electrode plates.

The distance between the plates 1 can vary between about 0.1–1 millimeter and, preferably, is about 0.5 millimeter. The volume of the sintered electrodes amounts, in the selected example, to totally 148 cubic centimeters and the inner volume of the vessel 2 to 300 cubic centimeters. The employed potassium lye has a specific gravity of 1.25 and the fine-grained admixture 3 of the electrolyte may be, for example, aluminum oxide, the suitable quantity thereof being about 115 grams and the corresponding quantity of lye is 125 grams. Alternatively, if the admixture consists of powder of plastic such as polyvinyl chloride powder, the suitable quantity is about 70 grams and the corresponding quantity of lye about 95 grams.

In storage battery cells with an alkaline electrolyte and with nickel oxides in the active material of the positive electrode the latter is poisoned, after a period of use, by substances present in the cell, so that the capacity of the cell is considerably reduced. This poisoning may be caused by such admixtures to the electrolyte which prevent any gas bubbles formed from rising in the electrolyte. The reduction of the capacity has been found to be particularly conspicuous in cells wherein the spaces between electrodes of opposite polarities are filled with a mass or viscous mixture consisting of an electrolyte and powdered or colloidal materials. A considerable improvement may be obtained by the admixture of a suitable substance to the positive electrode and preferably to the active mass thereof. According to a further aspect of the invention the positive electrode may contain an agent counteracting poisoning of said electrode by means of substances present in the cell.

A substance, which in practice has proved particularly advantageous is lithium, which may be contained in the active mass in the form of lithium hydroxide. Above all, where as an admixture to the electrolyte filling powders that are particularly favourable from the point of view of consistency and consequently from the point of view of gas absorption, such as aluminium oxide, are made use of, an admixture of lithium has been found to be capable of considerably augmenting the capacity of the positive electrode and of eliminating the poisoning tendencies manifesting themselves in connection with such a filling powder. But also with filling powders consisting of magnesium oxide or other metal oxides, powdered plastic, such as polyvinyl chloride, polystyrene, polyethylene, perlon, nylon and the like, improvements will be obtained in said respect.

In storage cells of the type in consideration, a lithium admixture to the positive electrode results in that on the whole the sensitivity to poisoning by means of foreign metals, such as even iron, is considerably reduced. Furthermore, the electrode is rendered less sensitive to overheating.

The suitable quantity of lithium in the positive electrode may vary under different conditions between about 0.01–5% of the weight of the active electrode material.

The agent counteracting posioning may be supplied in various ways. Particularly with sintered electrode plates the latter may be impregnated with a solution of said agent. The impregnation may be effected prior to the fitting of the positive electrode in the cell, and in connection with an admixture of lithium, for example, a hydroxide or salt solution may be made use of. It is also possible, however, to add the agent in consideration to the electrolyte of the cell, said agent being then absorbed by the positive electrode in the cell.

To fix the mutual distance of the electrodes, independently of the powder and the electrolyte, rods or bands or sparse gratings of plastic or similar material are preferably arranged between the plates of the cell. Finally, it should be mentioned that for the best functioning of closed cells of the type herein described the development of hydrogen gas at the negative electrode should be avoided on account of the fact that the absorption of the hydrogen gas proceeds much more slowly than that of the oxygen gas, by reason of which it will be very advantageous to overdimension the capacity of the negative electrode in comparison with that of the positive one.

In case of a more or less complete reduction of the capacity of one cell of a complete storage battery of cells in series, such cell will be charged reversely at a continued discharging of the battery. In the cell in question, a vivid generation of gas takes place, the active material of the electrodes being unable to absorb the gases. As a consequence the pressure increases rapidly in the cell. As a protection against explosion it is customary to furnish the cell with a safety valve or a thin safety plate, which opens or breaks, respectively, at a predetermined pressure. Should the vessel of the cell be provided with a small vent or hole, this should be located in a material which is not wetted by the electrolyte in the cell, whereby the risk of clogging of the vent or leakage of electrolyte is reduced. The same applies to structures in which the vent is formed by a porous plug, which thus should be made from a liquid repulsing material.

Generally, the foregoing description assumes the application of the invention to alkaline accumulators having sintered electrodes. However, the invention may be applied to alkaline accumulators with plane or tubular pocket electrodes and to accumulators having pocket electrodes in combination with sintered electrodes as, for example, sintered positive electrodes and negative electrodes of pocket type. The invention may further be applied to lead accumulators preferably of the type having electrodes with plane wall surfaces, for example, posted electrodes, and also to lead accumulators having tubular pockets.

What I claim is:

1. In a hermetically-sealed alkaline storage cell having a positive and a negative electrode spaced from each other in the cell housing, said electrodes each having an active material capable of absorbing the gas developed at the electrode of opposite polarity during charging; the invention which comprises a plastic mass filling the space between said electrodes, said plastic mass including fine grains of aluminum oxide wetted by an alkaline electrolyte, said grains being electrically non-conductive and resistant to the electrolyte, and a quantity of lithium anti-poisoning agent in said cell housing counteracting the poisoning influence of traces of aluminate originating from the aluminum oxide, the quantity of lithium amounting to 0.01 to 5.0% of the weight of the active material in said positive electrode.

2. A hermetically-sealed alkaline storage cell of the type wherein the gases developed during charging are absorbed by the active material of electrodes of opposite polarity comprising a cell vessel; a negative electrode in said vessel, said negative electrode consisting of a porous body, a metal powder layer on said porous body, and an active gas-absorbing material in the pores of said body; a positive electrode in said vessel spaced from said negative electrode, said positive electrode containing an active gas-absorbing material; and a viscous separator mass capable of transmitting gas bubbles between said electrodes, said separator mass filling said vessel and the spaces between said electrode and consisting of fine grains of aluminum oxide wetted by an alkaline electrolyte, said grains being electrically non-conductive and resistive to said electrolyte, said positive electrode containing a lithium agent for counteracting the poisoning of the positive electrode by aluminate, the quantity of lithium amounting to 0.01 to 5.0% of the weight of the active electrode material.

References Cited in the file of this patent

UNITED STATES PATENTS

| | | |
|---|---|---|
| 397,443 | Shaw | Feb. 5, 1889 |
| 715,412 | Paget | Dec. 9, 1902 |
| 876,445 | Edison | Jan. 14, 1908 |
| 903,799 | Smith | Nov. 10, 1908 |
| 1,213,182 | Gardiner | Jan. 23, 1917 |
| 1,687,307 | Oppenheim | Oct. 9, 1928 |

(References on following page)

UNITED STATES PATENTS

| | | |
|---|---|---|
| 2,176,173 | Fuller et al. | Oct. 17, 1939 |
| 2,561,943 | Moulton et al. | July 24, 1951 |
| 2,571,927 | Neumann | Oct. 16, 1951 |
| 2,614,138 | Jacquier | Oct. 14, 1952 |
| 2,646,455 | Jeannin | July 21, 1953 |
| 2,647,938 | Taylor | Aug. 4, 1953 |
| 2,653,987 | Baty | Sept. 29, 1953 |
| 2,708,211 | Koren et al. | May 10, 1955 |
| 2,737,541 | Coolidge | Mar. 6, 1956 |

OTHER REFERENCES

"Refractory Materials," Searle, page 169.